E. Y. MOORE.
CHAIN GRIPPING DEVICE.
APPLICATION FILED MAY 22, 1913.
1,179,951.
Patented Apr. 18, 1916.
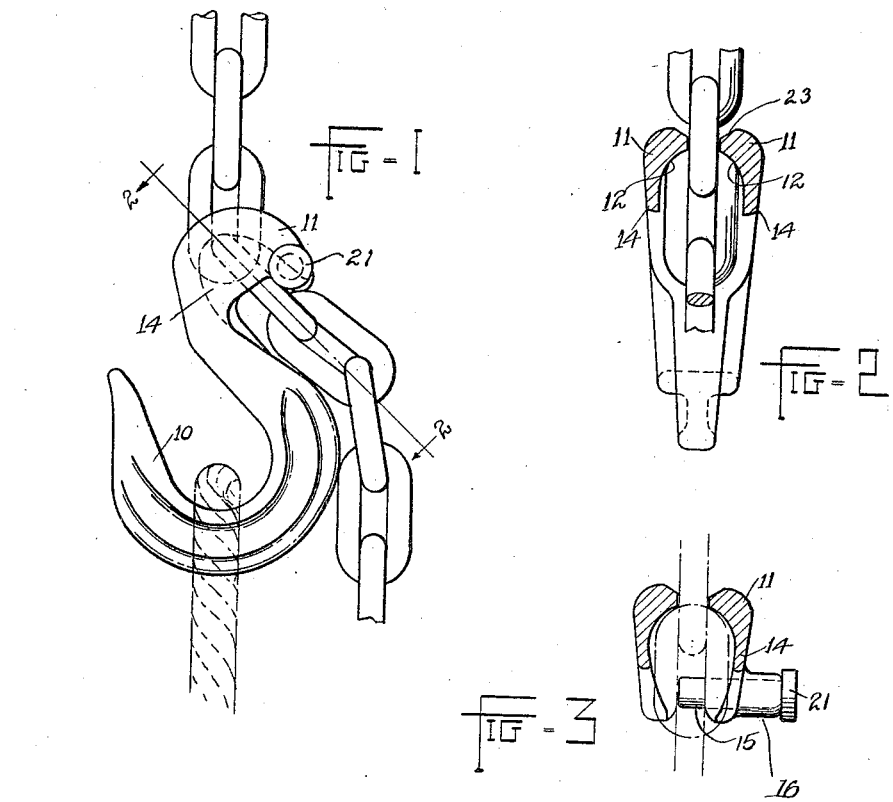

UNITED STATES PATENT OFFICE.

EDWARD YOUNG MOORE, OF CLEVELAND, OHIO.

CHAIN-GRIPPING DEVICE.

1,179,951.  Specification of Letters Patent.  Patented Apr. 18, 1916.

Application filed May 22, 1913. Serial No. 769,157.

*To all whom it may concern:*

Be it known that I, EDWARD Y. MOORE, a citizen of the United States, residing at Cleveland, in the county of Cuyahoga and State of Ohio, have invented a certain new and useful Improvement in Chain-Gripping Devices, of which the following is a full, clear, and exact description, reference being had to the accompanying drawings.

This invention relates to hooks, designed especially for use in connection with hoisting chains, and adapted to be quickly attached to any part of the chain.

An object of the invention is to provide a hook which may be quickly attached to any part of such a chain and which may be quickly detached therefrom.

Another object is to provide simple and effective means for locking the hook to the chain.

Still another object is to so design the hook that it may be very strong without being cumbersome and heavy.

These, and other objects, will become apparent as the hook is described in connection with the drawings.

In the drawing, Figure 1 is a side elevation of my hook showing it locked to the chain; Fig. 2 is a section taken on the line 2—2 looking in the direction of the arrows; Fig. 3 is a section taken on the same line, looking away from the hook and showing the locking device; Fig. 4 is an enlarged view of the upper portion of the hook showing the locking device; Fig. 5 is a section through the locking device along the line 5—5 of Fig. 4.

10, in the drawings, indicates the hook proper, which, as shown, is substantially S-shaped and has its upper portion or head forked as at 11, so that it is adapted to straddle a link of the chain turned edgewise toward the shank of the hook. These two portions 11, which form the bifurcated head of the hook, are substantially parallel tines which hook downwardly and are spaced apart sufficiently to straddle a chain link turned edgewise, to rest upon one turned crosswise of the hook between the tines 11.

Figs. 2 and 3 show how the hook engages one link of the chain and rests upon the link next below it. As shown, these tines 11 have downwardly curved surfaces 12, which approximately fit the curved end of the link upon which they rest. Beneath these curved surfaces the tines 11 are extended downwardly forming webs 14 across the loop of the tine, thus greatly strengthening it. The lower loop of the hook 10 may be substantially I-shaped in cross section, as shown in Figs. 1 and 2, to strengthen the hook without adding to its weight.

To lock the hook securely on the chain, I provide a bolt 15, carried by a suitable boss 16 on one of the tines 11. This bolt 15 is slidably held in the boss 16, so that it may be drawn out of the way while sliding the hook onto the link which is is to engage. When the hook is in position on the chain, the bolt 15 is pushed into the position shown in Fig. 4, thus securely locking the link between these two tines 11.

To prevent the bolt sliding out inadvertently, I provide in the boss 16 a small pin 18 in engagement with a slot 19 in the bolt 15. The slot 19 extends longitudinally of the bolt 15 and meets at its outer end a transverse slot 20, which provides for the bolt being turned partly around, with the pin 18 in engagement with the slot 20, thus preventing the outward movement of the bolt 15. A suitable head 21 is provided on the bolt 15 for grasping it by hand, and a small plug 22 in the slot 19 prevents the bolt coming entirely out of the boss 16.

The tines 11 may be conveniently pointed at their outer ends and the upper part of the tines beveled inwardly, as at 23, so that the hook may be more readily placed on the chain. The bolt 15 is drawn outwardly before it is so placed; then, after the hook is placed, the bolt is shoved in and locked by being turned so that the walls of the arcual slot 20 embrace the stationary pin 18.

In Fig. 1 the hook is represented as supporting a load, thus causing the portion of the chain below the tines 11 to hang loosely out over the back of the hook.

It will be seen from the foregoing description that I have provided a hook which may be quickly attached to any part of the chain and which may be quickly locked in place or just as quickly unlocked when it is desired to detach the hook from the chain.

Having thus described my invention, what I claim is:

1. In a device of the character described, the combination with a shank, of a head made in the form of a pair of rearwardly extending curved tines integral with the shank and adapted to embrace one link of a chain and rest on the next link below, integral webs across the outer portions of the loops and merging with the shank, said webs being of such width that they terminate at points adjacent the ends of the tines and extend a considerable distance over said link on which the tines rest, the inner sides of said webs being curved inwardly to meet the tines adjacent the link embraced thereby.

2. In a chain gripping device, the combination of a shank, a bifurcated head at one end of the shank, and a bolt adapted to extend crosswise of the space between the two portions of the head and engage the chain.

3. A device of the character described having a bifurcated head forming two rearwardly extending tines adapted to straddle one link of a chain and rest upon the link below it, webs across the loops of said rearwardly extending tines, and a locking device carried by the bifurcated head for locking the same to the chain.

4. In a device of the character described, a shank, a bifurcated head rigid with the shank forming two rearwardly extending tines adapted to straddle one link of a chain and rest upon the link below it, webs across the loops of the rearwardly extending tines, a locking bolt carried by the bifurcated head and adapted to extend crosswise of the opening thereof having a longitudinal slot and a transverse slot, and means for engaging the slots in the locking bolt to hold it in position.

In testimony whereof, I hereunto affix my signture in the presence of two witnesses.

EDWARD YOUNG MOORE.

Witnesses:
V. MUMFORD MOORE,
A. H. CHAPPELKA.

Copies of this patent may be obtained for five cents each, by addressing the "Commissioner of Patents, Washington, D. C."